United States Patent
Hong

(10) Patent No.: US 10,173,911 B2
(45) Date of Patent: Jan. 8, 2019

(54) WATER TREATMENT APPARATUS FOR PRODUCING ACTIVATED WATER

(71) Applicant: Sung Uk Hong, Seongnam-si (KR)

(72) Inventor: Sung Uk Hong, Seongnam-si (KR)

(*) Notice: Subject to any disclaimer, the term of this patent is extended or adjusted under 35 U.S.C. 154(b) by 292 days.

(21) Appl. No.: 15/115,805

(22) PCT Filed: Aug. 4, 2015

(86) PCT No.: PCT/KR2015/008119
§ 371 (c)(1),
(2) Date: Aug. 1, 2016

(87) PCT Pub. No.: WO2016/047918
PCT Pub. Date: Mar. 31, 2016

(65) Prior Publication Data
US 2017/0008780 A1     Jan. 12, 2017

(30) Foreign Application Priority Data

Sep. 23, 2014  (KR) .................. 20-2014-0006924 U

(51) Int. Cl.
| | | |
|---|---|---|
| *C02F 1/48* | (2006.01) | |
| *C02F 1/46* | (2006.01) | |
| *C02F 1/461* | (2006.01) | |

(52) U.S. Cl.
CPC .............. *C02F 1/48* (2013.01); *C02F 1/4608* (2013.01); *C02F 1/46114* (2013.01); *C02F 2201/46105* (2013.01)

(58) Field of Classification Search
None
See application file for complete search history.

(56) References Cited

FOREIGN PATENT DOCUMENTS

| JP | 2006-066878 A | 3/2006 |
|---|---|---|
| JP | 2008-002937 A | 1/2008 |
| KR | 10-2008-0004296 A | 1/2008 |
| KR | 10-2009-0037569 A | 4/2009 |
| KR | 10-2012-0085441 A | 8/2012 |

OTHER PUBLICATIONS

International Search Report for PCT/KR2015/008119 dated Nov. 25, 2015 from Korean Intellectual Property Office.

*Primary Examiner* — Kishor Mayekar
(74) *Attorney, Agent, or Firm* — Paratus Law Group, PLLC

(57) ABSTRACT

A water treatment apparatus for producing activated water, including: a vessel having a water inlet and a water outlet and having a flange that extends outward from the upper end of the outer circumferential surface thereof; an insulating case having an empty space inside, the closed lower end of which is inserted into the vessel, and formed of an insulating synthetic resin; an insulated electrode bar inserted into the empty space of the insulating case; and a high-voltage generation unit installed on the upper end of the insulating case and configured to apply a high voltage to the electrode bar.

11 Claims, 6 Drawing Sheets

WATER TREATMENT APPARATUS FOR PRODUCING ACTIVATED WATER

CROSS REFERENCE TO PRIOR APPLICATIONS

This application is a National Stage Patent Application of PCT International Patent Application No. PCT/KR2015/008119 (filed on Aug. 4, 2015) under 35 U.S.C. § 371, which claims priority to Korean Patent Application No. 20-2014-0006924 (filed on Sep. 23, 2014), which are all hereby incorporated by reference in their entirety.

TECHNICAL FIELD

The present invention relates to a water treatment apparatus for producing activated water, and more specifically, to a water treatment apparatus for producing activated water that can produce small cluster water (i.e., activated water) consisting of a few water molecules by separating and splitting a cluster consisting of tens of water molecules by generating an underwater electric field.

BACKGROUND ART

Water has a molecular structure consisting of two hydrogen (H) atoms and one oxygen (O) atom. It is known that a water molecule H2O does not exist independently in water in its natural state, but exists as a cluster in which tens of water molecules are bonded with each other. A water cluster is known to be maintained by a large number of hydrogen bonds that are continually formed and destroyed, and the magnitude of the water cluster varies depending on numerous factors that affect the hydrogen bonds.

According to studies, a cluster consisting of a small number of water molecules, for example, small cluster water consisting of several water molecules is rapidly absorbed into a cell thanks to its good permeability to a cell and activates the metabolism of an animal or plant. In addition, it is known that small cluster water prevents scale and restricts corrosion in a pipe in which water flows. Such small cluster water is generally referred to as activated water.

In the related art, a method for producing activated water by separating and splitting water clusters using an underwater electric field has been known.

Referring to Korean Patent Publication No. 10-2008-0004296, an electrode bar having an insulation layer coated thereon is inserted into an electrode bar case that constitutes a vessel, and water clusters passing through the electrode bar case are separated and split by an electric field to produce activated water. However, the activated-water producing apparatus in the related art has problems in that: the insulation layer may be easily destroyed so that the apparatus loses its function; and water may easily penetrate between the electrode bar having the insulation layer coated thereon and the electrode bar case.

DETAILED DESCRIPTION OF THE INVENTION

Technical Problem

An aspect of the present invention is to provide a water treatment apparatus for producing activated water that: improves electrical insulation; facilitates the installation of an electrode bar; and easily prevents water leakage thanks to a double insulation structure.

Another aspect of the present invention is to provide a water treatment apparatus for producing activated water that can accelerate the separation of water clusters by making the direction of an electric field, which is generated by a high voltage applied to an electrode bar, changed according to a path along which water moves.

Technical Solution

A water treatment apparatus for producing activated water, according to the present invention, includes: a vessel having a water inlet and a water outlet and having a flange that extends outward from the upper end of the outer circumferential surface thereof; an insulating case having a cylindrical shape with an empty space inside, the closed lower end of which is inserted into the vessel, and formed of an insulating synthetic resin, wherein a flange extends outward from the upper end of the outer circumferential surface of the insulating case and makes contact with the flange of the vessel, or the upper surface of an upper support plate configured to partially cover the upper end of the vessel, to form a receiving space isolated from the interior of the vessel; an insulated electrode bar inserted into the empty space of the insulating case, wherein the insulated electrode bar includes an electrode bar and an internal insulator formed of an insulating material and configured to surround the outer circumferential surface and the lower end of the electrode bar; and a high-voltage generation unit installed on the upper end of the insulating case and configured to apply a high voltage to the electrode bar, and the insulating case, together with the internal insulator, forms a double insulation layer for the electrode bar.

According to the present invention, the flange of the insulating case extends to a position where the flange of the insulating case makes surface-to-surface contact with the flange of the vessel, and the flange of the insulating case and the flange of the vessel are fixedly coupled to each other.

According to the present invention, a fixing plate having a central hole formed therein covers the upper portion of the insulating case and is fixedly coupled to the flange of the vessel, and the electrode bar is electrically connected with the high-voltage generation unit through the central hole of the fixing plate.

According to the present invention, the empty space between the insulating case and the insulated electrode bar is filled with an insulating filling material.

According to the present invention, a buffer plate formed of an insulating material is installed between the bottom of the empty space of the insulating case and the lower end of the insulated electrode bar.

According to the present invention, the internal insulator of the insulated electrode bar has a cylindrical shape with an empty space inside, the lower end of which is closed; the electrode bar is inserted into the empty space of the internal insulator; and the empty space between the internal insulator and the electrode bar is filled with an insulating filling material.

According to the present invention, a buffer plate formed of an insulating material is installed between the bottom of the empty space of the internal insulator and the lower end of the electrode bar.

According to the present invention, the vessel has a cylindrical shape, and the inlet and outlet are formed to be inclined with respect to the outer circumferential surface of the vessel.

According to the present invention, the electrode bar may have a non-linear shape that obliquely extends in an up-down direction with respect to a bending point, or may have a non-linear shape that spirally extends in the longitudinal direction.

Advantageous Effects

According to the present invention, electrical insulation is improved thanks to a double insulation structure. Accordingly, even though one of the insulation layers suffers from cracking or damage, it is possible to prevent the apparatus from losing its function. In addition, impact resistance is further improved by virtue of a buffer structure against an impact.

According to the present invention, it is possible to facilitate the installation of an electrode bar and the formation of a waterproof structure.

According to the present invention, the separation of water clusters can be accelerated by making the direction of an electric field, which is generated by a high voltage applied to an electrode bar, changed according to a path along which water moves, thereby improving the production efficiency of activated water.

MODE FOR CARRYING OUT THE INVENTION

Hereinafter, embodiments of a water treatment apparatus for producing activated water, according to the present invention, will be described in detail with reference to the accompanying drawings.

Figure 1:
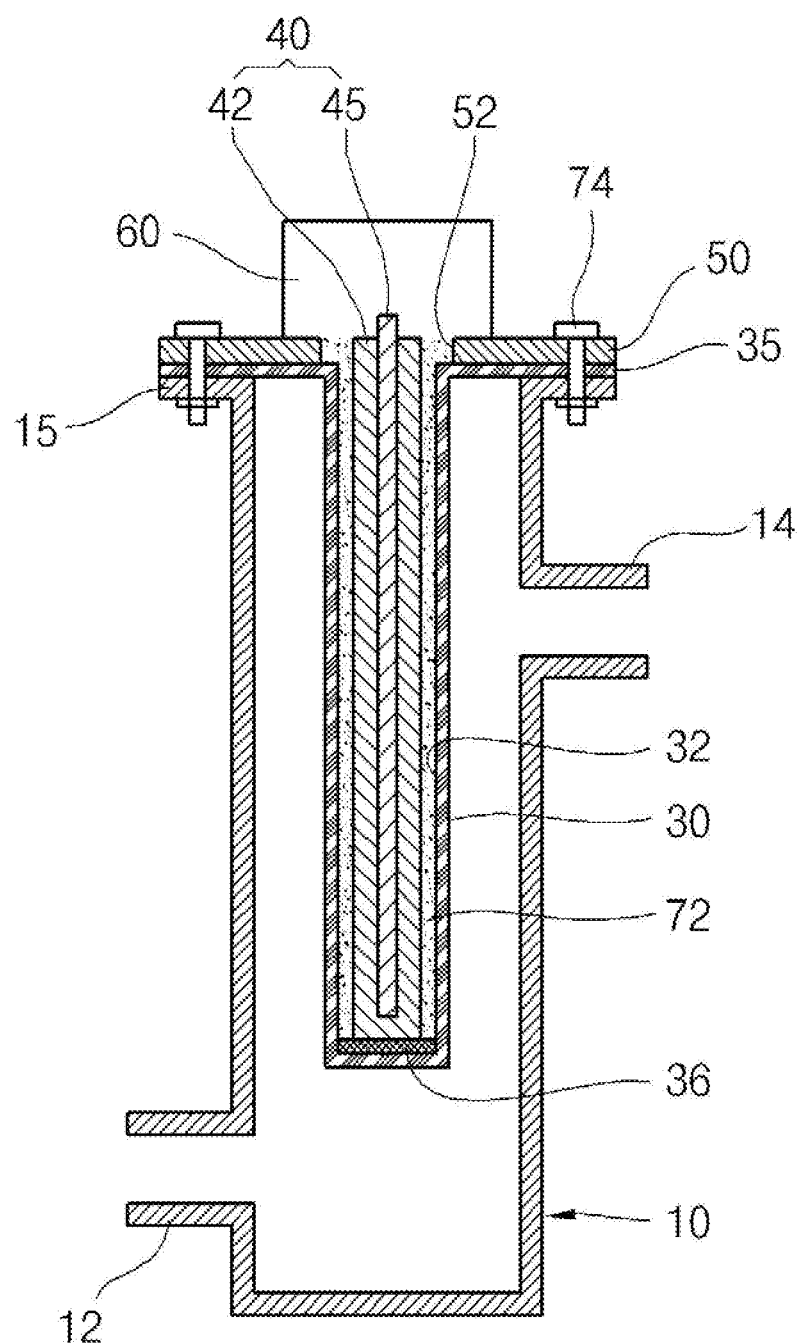
FIG. 1 is a sectional view of a water treatment apparatus for producing activated water according to a first embodiment of the present invention.

FIG. 1 is a sectional view of a water treatment apparatus for producing activated water according to a first embodiment of the present invention.

Referring to the drawing, the water treatment apparatus for producing activated water, according to the present invention, includes: a vessel 10 having a water inlet and a water outlet; an insulating case 30; and an insulated electrode bar 40.

The vessel 10 provides a space where water is introduced and the water cluster is treated as activated water, which is cluster water consisting of several water molecules, while being split by an electric field. The vessel 10 has a cylindrical shape that has a water inlet 12 on the lower side thereof and a water outlet 14 on the upper side thereof, in which water is introduced thereinto through the water inlet 12 and is discharged therefrom through the water outlet 14.

Although the vessel 10 preferably has a cylindrical shape, the vessel 10 is not limited thereto. The vessel 10 is preferably formed of a stainless steel for the purpose of anti-corrosion, but the vessel 10 is not limited thereto.

The vessel 10 has a flange 15 that extends outward from the upper end of the outer circumferential surface thereof.

The insulating case 30 has a cylindrical shape with an empty space 32 inside, the closed lower end of which is inserted into the vessel 10. The insulating case 30 has a flange 35 that extends outward from the upper end of the outer circumferential surface thereof. According to the first embodiment of the present invention, the flange 35 extends to a position where the flange 35 is brought into contact with the flange 15 while facing the same, and is supported by the flange 15. The empty space 32 of the insulating case 30 is isolated from the internal space of the vessel 10 in which water is received, and forms a receiving space for receiving the insulated electrode bar 40.

Figure 2:
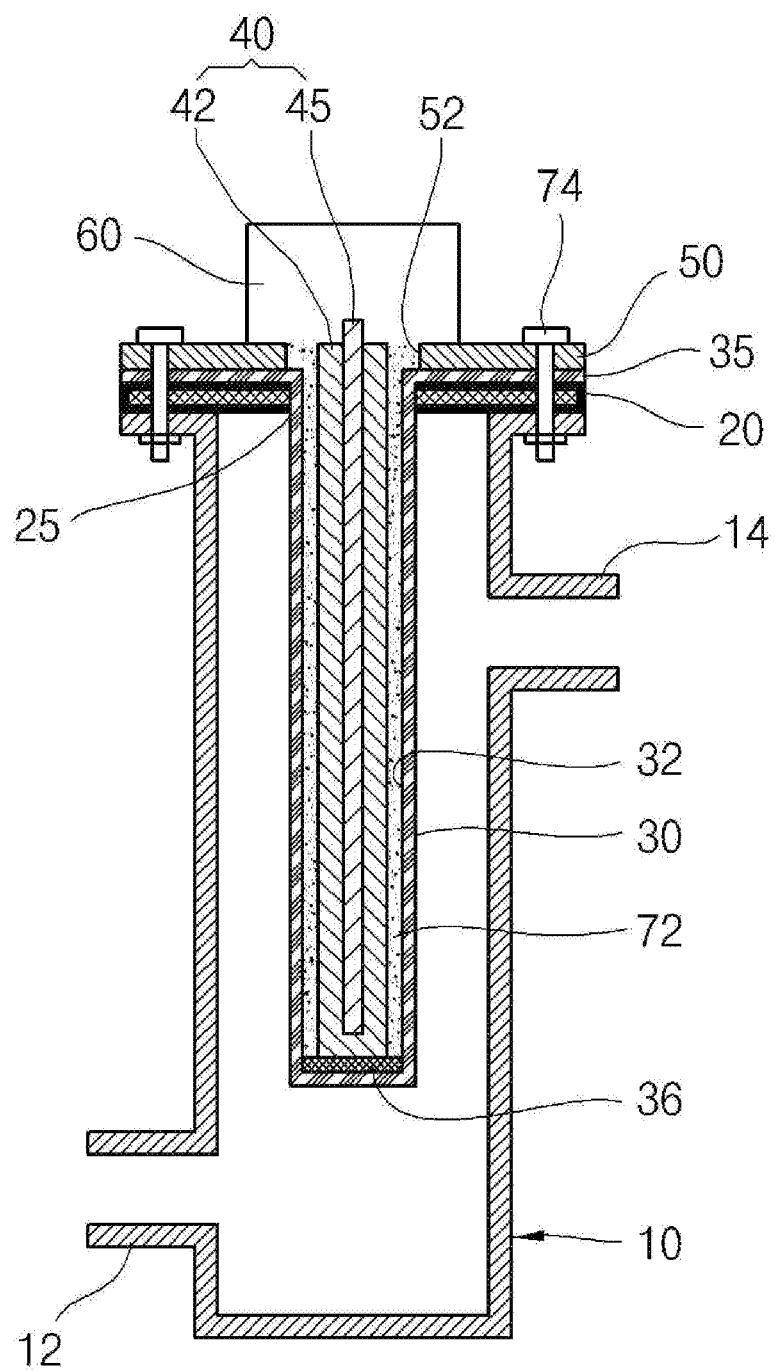
FIG. 2 is a sectional view of a water treatment apparatus for producing activated water according to a second embodiment of the present invention.

Referring to FIG. 2, which illustrates the second embodiment of the present invention, the vessel 10 may further include an upper support plate 20 having a central hole 25 formed therein into which the insulating case 30 formed of an insulating material is inserted. The upper support plate 20 covers the upper end of the vessel 10, and the insulating case 30 is inserted into the vessel 10 through the central hole 25 of the upper support plate 20. In this case, the flange 35 of the insulating case 30 is brought into contact with, and supported by, the upper surface of the upper support plate 20. The upper support plate 20 functions to bear the load applied to the flange 35 of the insulating case 30 while making contact with the flange 35. In a case where the length of the flange 35 of the insulating case 30 increases with an increase in the size of the vessel 10, the insulating case 30 may be installed through the central hole 25 of the upper support plate 20 while the upper support plate 20 is disposed on the upper end of the vessel 10, as in the embodiment illustrated in FIG. 3, in order to stably support the insulating case 30.

According to the present invention, the insulating case 30 is formed of a synthetic resin that has electrical insulation and is elastically deformable. The insulating case 30 is preferably formed of at least one of Teflon, polyethylene, polypropylene, urethane, an epoxy resin, a phenolic resin, a silicone resin, a melamine resin, and PVC.

The insulating case 30 forms a double insulation layer for an electrode bar 45 together with an internal insulator 42 surrounding the electrode bar 45 to enhance the stability of insulation, and simultaneously forms a receiving space isolated from the interior of the vessel 10, thereby enabling the electrode bar 45 to be assembled irrespective of the interior of the vessel 10, which results in an improvement in assembly efficiency.

Meanwhile, the flange 35 of the insulating case 30 is coupled to the flange 15 of the vessel 10 or the upper surface of the upper support plate 20 while making surface-to-surface contact therewith, which makes it possible to provide good water-tightness. Further, since the flange 35 of the insulating case 30 and the flange 15 of the vessel 10 are fixedly coupled to each other through fastening means 74, which will be described below, while making surface-to-surface contact with each other, an additional element is not required for fixing the insulated electrode bar 40. In addition, since the flange 35 of the insulating case 30 and the flange 15 of the vessel 10 are coupled to each other through the fastening means, water leakage between the insulated electrode bar 40 and the vessel 10 can be prevented, and even though water leaks, the water is less likely to flow toward a high-voltage generation unit 60 so that stability can be improved.

The insulated electrode bar 40 is inserted into the empty space 32 in the insulating case 30. The insulated electrode bar 40 includes the electrode bar 45 and the internal insulator 42 that surrounds the electrode bar 45. The electrode bar 45 functions to generate an electric field in the water within the vessel 10, in which a high positive (+) voltage is applied to the electrode bar 45 while a negative (−) voltage is applied to the vessel 10, or while the vessel 10 is grounded.

According to the structure of the present invention, the insulating case 30 makes direct contact with the water received in the vessel 10, but the insulated electrode bar 40 does not make direct contact with the water received in the vessel 10 since the insulated electrode bar 40 is inserted into the insulating case 30.

Thanks to the double insulation layer structure in which the insulated electrode bar 40 is not directly exposed to the water received in the vessel 10 as described above, electrical insulation can be remarkably improved. In addition, the insulating case 30 is not easily damaged by an external impact since the insulating case 30 is formed of a synthetic resin with electrical insulation.

Namely, a synthetic resin has flexibility to return to its original state by virtue of its resilience, in addition to rigidity, even though an external impact is applied thereto. Accordingly, the insulating case 30 of the present invention, which is formed of a synthetic resin with electrical insulation, is not easily damaged and has more improved electrical insulation.

Meanwhile, a high voltage ranging from 20,000 V to 30,000 V is generally applied to the apparatus for producing activated water, and there is a danger that a part that makes direct contact with the high-voltage will be damaged. Accordingly, in a case where the insulated electrode bar 40 is directly inserted into the vessel 10, the insulator of the insulated electrode bar makes direct contact with the high voltage ranging from 20,000 V to 30,000 V so that the insulator of the insulated electrode bar 40 is likely to be damaged.

However, according to the double insulation layer structure of the present invention, the insulated electrode bar 40 is inserted into the insulating case 30, and the insulating case 30 is submerged in water. Accordingly, even though the insulator of the insulated electrode bar 40 is damaged, the insulation layer that corresponds to the insulating case 30 can prevent the apparatus from losing its function on account of the damage to the insulator and can ensure electrical insulation, thereby significantly improving stability.

Meanwhile, in a case where the material of the electrode bar 45 has a low conductivity, the water treatment apparatus may consume a large amount of power, and it may be difficult to generate a high voltage. Accordingly, the electrode bar is preferably formed of, or plated with, silver, aluminum, zinc, or an alloy thereof.

The internal insulator 42 is formed to surround the electrode bar 45. As disclosed in the first embodiment of the present invention, the insulated electrode bar 40, in which the internal insulator 42 surrounds the electrode bar 45 to form an insulation layer, may be inserted into the empty space 35 of the insulating case 30. The internal insulator 42 is preferably formed of at least one of Teflon, polyethylene, polypropylene, urethane, an epoxy resin, a phenolic resin, a silicone resin, a melamine resin, PVC, ceramics, magnesium oxide, and glass, and is more preferably formed of ceramics or magnesium oxide for the improvement of electrical insulation.

Since the insulating case 30 has the empty space 32, the lower end of which is closed, the insulated electrode bar 40 may be stably installed, as compared with when the insulating case 30 does not exist, even though a separate support for supporting the lower end of the insulated electrode bar 40 is not formed within the vessel 10.

The empty space 32 of the insulating case 30 is filled with a filling material, such as an epoxy resin 72, while the insulated electrode bar 40 is inserted into the empty space 32 of the insulating case 30. The insulated electrode bar 40 may be stuck to the insulating case 30 by the epoxy resin 72 such that the insulated electrode bar 40 does not move within the empty space of the insulating case 30, and the epoxy resin 72 functions as a buffer material against an impact. Further, the epoxy resin 72 between the insulating case 30 and the internal insulator 42 functions to additionally improve electrical insulation.

A buffer plate 36 formed of an insulating resin material (such as rubber, etc.) may be additionally provided on the bottom of the empty space 32 in the insulating case 30. The buffer plate 36 between the internal insulator 42 and the insulating case 30 functions as a buffer material against an impact, and improves the contact between the lower surface of the internal insulator 42 and the bottom of the empty space 32 in the insulating case 30. Accordingly, an impact may be absorbed even when the empty space 32 of the insulating case 30 is not filled to the bottom with the epoxy resin 72.

A fixing plate 50 having a central hole 52 formed therein covers the upper surface of the insulating case 30. The fixing plate 50 is formed to be sufficiently large to cover the flange 15 of the vessel 10 and is fixed to the flange 15 of the vessel by the fastening means 74 (such as bolts, etc.) with the flange 35 of the insulating case 30 interposed therebetween. A sealing member may be additionally interposed between the vessel 10 and the insulating case 30 and between the insulating case 30 and the fixing plate 50 in order to improve water tightness.

Through the central hole 52 of the fixing plate 50, the gap between the insulating case 30 and the insulated electrode bar 40 in the empty space 32 thereof is filled with the epoxy resin 72, and the electrode bar 45 is electrically connected with an external circuit.

The high-voltage generation unit 60, which includes an electric circuit that applies a high voltage to the electrode bar 45, is installed on the fixing plate 50. The high-voltage generation unit 60 includes a circuit unit that has a transformer mounted thereon, and functions to supply a high positive (+) voltage to the electrode bar with electric power applied thereto.

Figure 3:
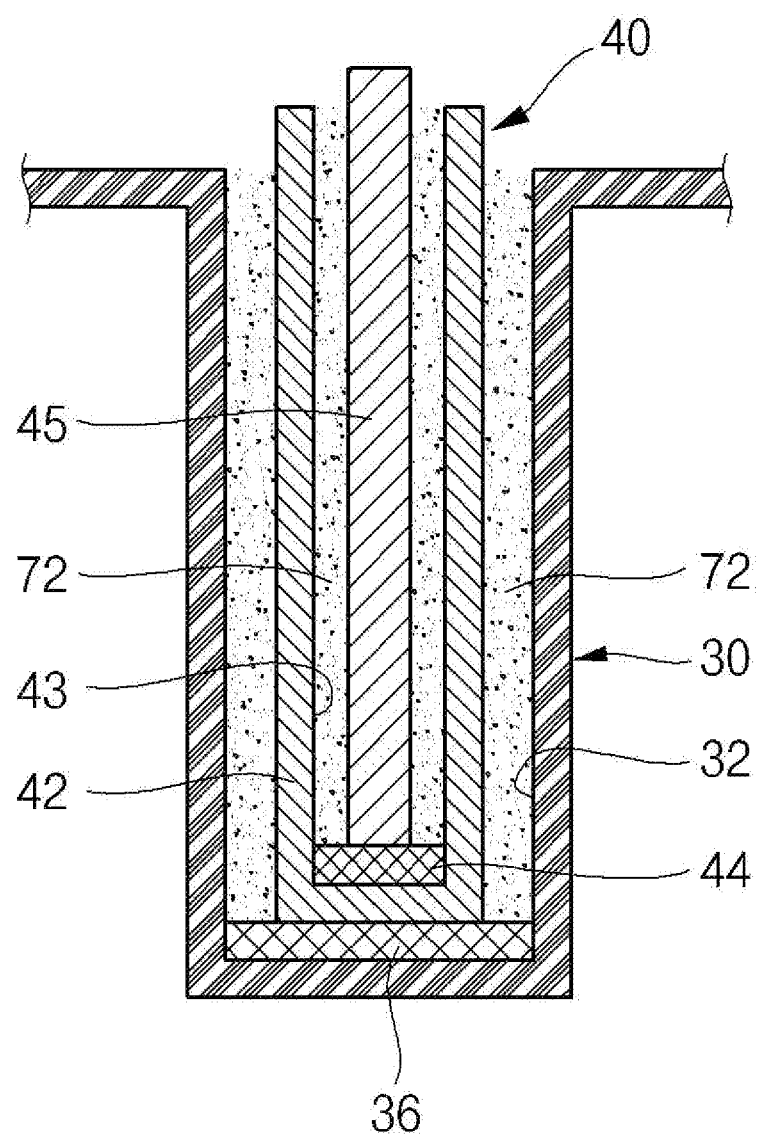
FIG. 3 is a fragmentary sectional view of a water treatment apparatus for producing activated water according to a third embodiment of the present invention.

FIG. 3 is a view illustrating a third embodiment of the present invention, where FIG. 3 shows an illustration in which an internal insulator 42 and an electrode bar 45, which constitute an insulated electrode bar 40, are separately assembled. The internal insulator 42 has a cylindrical shape with an empty space 43 inside, the lower end of which is closed, and the electrode bar 45 is inserted into, and installed in, the empty space of the internal insulator 42. The empty space 43 of the internal insulator 42 is filled with an insulating filling material, such as an epoxy resin 72, while the electrode bar 45 is inserted into the empty space 43 of the internal insulator 42. The electrode bar 45 may be stuck to the internal insulator 42 by the epoxy resin 72 such that the electrode bar 45 is prevented from moving within the empty space 43 of the internal insulator 42, and the epoxy resin 72 functions as a buffer material against an impact.

A buffer plate 44 formed of an insulating resin material (such as rubber, etc.) may be additionally provided on the bottom of the empty space 43 in the internal insulator 42. The buffer plate 44 between the internal insulator 42 and the electrode bar 45 functions as a buffer material against an impact and improves the contact between the lower surface of the electrode bar 45 and the bottom of the empty space in the internal insulator 42. Accordingly, an impact may be absorbed even when the empty space 43 of the internal insulator 42 is not filled to the bottom with the epoxy resin 72.

According to the present invention, since the electrode bar 45 is electrically insulated by a double insulation layer that is formed by an insulating case 30 and the internal insulator 42, even though one of the insulation layers is broken down, it is possible to prevent damage to the function of the electrode bar 45 while maintaining insulation performance. Further, since the insulating case 30, the internal insulator 42, and the electrode bar 45 are stuck to each other through the epoxy resin 72, it is possible to minimize a movement therebetween caused by an impact and to absorb the impact, thereby further minimizing a possibility that the insulation layer will be damaged. In addition, it is possible to more easily form the watertight structure by virtue of the shape of the insulating case 30.

Figure 4:
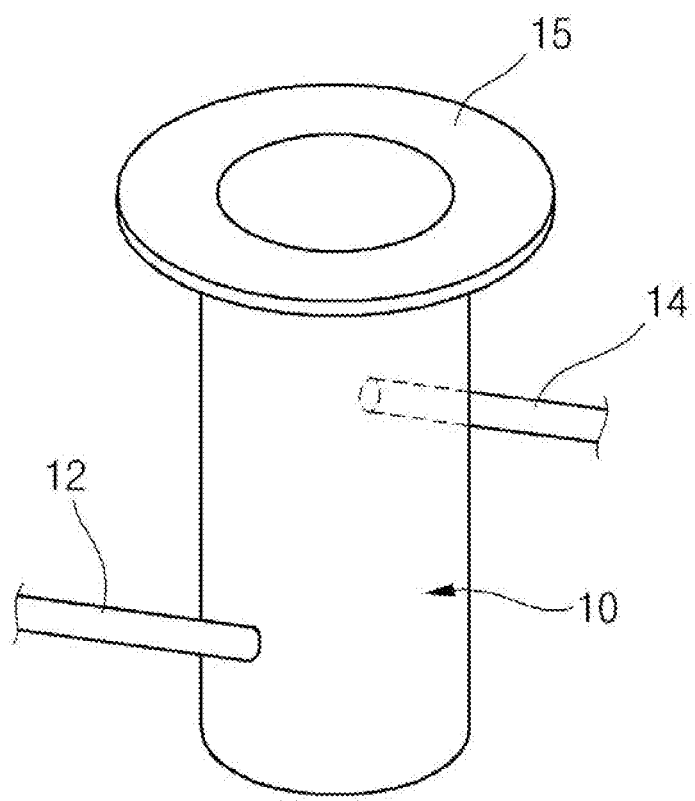
FIG. 4 is a perspective view illustrating the exterior of a vessel of a water treatment apparatus for producing activated water according to a fourth embodiment of the present invention.

FIG. 4 is a perspective view illustrating the exterior of a vessel of a water treatment apparatus for producing activated water according to a fourth embodiment of the present invention.

Referring to FIG. 4, an inlet 12 of the vessel 10 extends from the vessel 10 so as to be inclined with respect to the outer circumferential surface of the main body of the vessel 10, and an outlet 14 also extends from the vessel 10 so as to be inclined with respect to the outer circumferential surface of the main body of the vessel 10. Due to this, the water introduced into the vessel 10 through the inlet 12 is separated into water clusters while flowing in the vessel 10 in a spiral direction by the supply pressure and is thereafter discharged through the outlet.

In accordance with the current theory on water clusters, the clusters are maintained by a large number of hydrogen bonds that are continually formed and destroyed. When the water introduced into the vessel 10 is affected by the electric field generated by a high positive voltage applied to an electrode bar 45 while flowing in the spiral direction by virtue of the spiral arrangement of the inlet 12 and the outlet 14, the fluidity of the water molecules is enhanced, and the water clusters are split. As a result, activated water is more efficiently produced.

Figure 5:
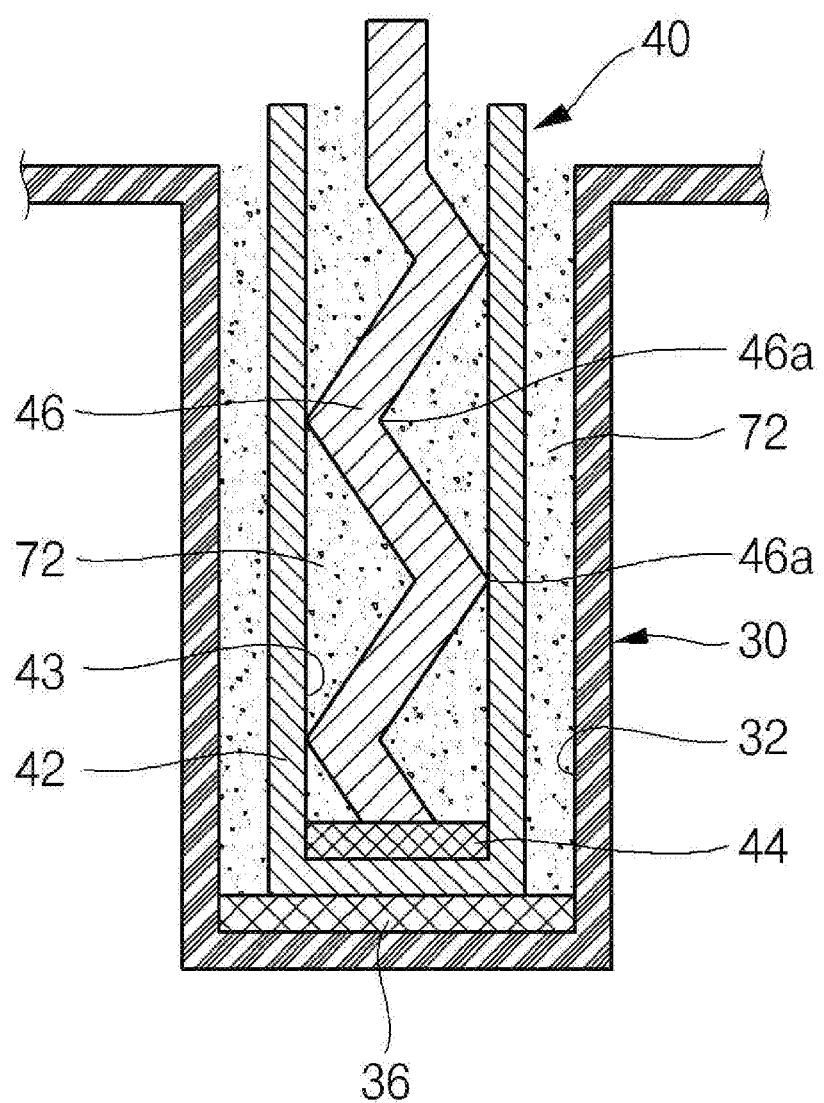
FIG. 5 is a fragmentary sectional view of a water treatment apparatus for producing activated water according to a fifth embodiment of the present invention.

FIG. 5 is a fragmentary sectional view of a water treatment apparatus for producing activated water according to a fifth embodiment of the present invention.

Referring to FIG. 5, the water treatment apparatus for producing activated water, according to the fifth embodiment of the present invention, includes an electrode bar 46 that extends in zigzags rather than in a linear way. The electrode bar 46 is a non-linear electrode bar that obliquely extends in an up-down direction with respect to bent portions 46a to form a zigzag shape as a whole.

An electric field that is applied to the water in a vessel in order to separate water clusters is generated by a high voltage that is applied to the electrode bar 46, and the direction of the electric field is affected by the direction in which the electrode bar extends.

In a case where the electrode bar 46 extends in zigzags as in the fifth embodiment of the present invention, the direction of an electric field that is generated by a high voltage applied to the electrode bar 46 in an up-down direction with respect to each bending point 46a of the electrode bar 46 varies. Accordingly, when the water introduced into the vessel 10 flows, water molecules that constitute the water clusters more actively move in response to the change of the electric field that is applied to the water in the process in which the water introduced through the inlet 12 is discharged through the outlet 14 while moving upward. Due to this, the separation of the water clusters is more actively accelerated, as compared with when an electric field is generated in water in a predetermined direction. As a result, activated water is more efficiently produced.

Figure 6:
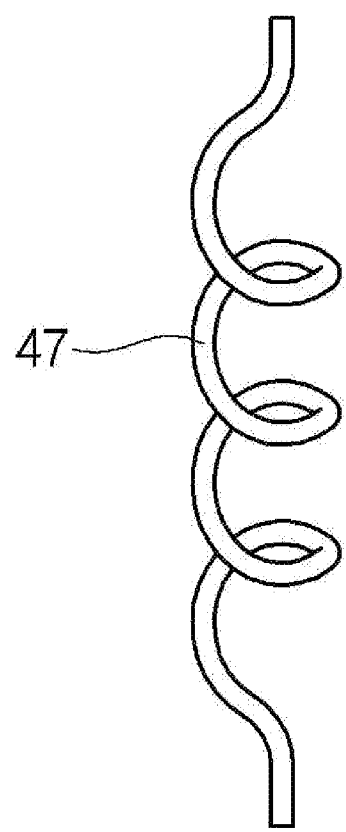
FIG. 6 is a perspective view of an electrode bar of a water treatment apparatus for producing activated water according to a sixth embodiment of the present invention.

FIG. 6 is a perspective view of an electrode bar of a water treatment apparatus for producing activated water according to a sixth embodiment of the present invention. Referring to FIG. 6, the electrode bar 47 spirally extends in the longitudinal direction. The sixth embodiment of the present invention illustrated in FIG. 6 and the fifth embodiment of the present invention illustrated in FIG. 5 are the same as each other in that the electrode bar 47 is a non-linear bar, but differ from each other in that the electrode bar 47 extends in a spiral form.

As the electrode bar 47, according to the sixth embodiment of the present invention, extends in a spiral form, the direction of an electric field that is generated by a high positive (+) voltage applied to the electrode bar 47 varies according to the direction in which the electrode bar 47 extends. Accordingly, when the water introduced into a vessel 10 flows, water molecules that constitute the water clusters more actively move in response to the change of the electric field that is applied to the water in the process in which the water introduced through an inlet 12 is discharged through an outlet 14 while moving upward.

The water produced (i.e., activated) by the water treatment apparatus is known to be maintained in the activated state at room temperature for a few hours, and accelerates the absorption of drugs or beverages, as well as activating the metabolism of animals and plants, so that the activated water may be used for various purposes. In addition, it has been known that harmful bacteria in water are destroyed by an electric field in the process of activating the water.

Although the embodiments of the present invention have been described above with reference to the accompanying drawings, the scope of the present invention is not limited to the embodiments illustrated in the accompanying drawings, and various modifications can be made without departing from the spirit and scope of the present invention as hereinafter claimed.

INDUSTRIAL APPLICABILITY

According to the present invention, it is possible to manufacture a water treatment apparatus for producing activated water that improves electrical insulation and impact resistance and facilitates the installation of an electrode bar and the formation of a waterproof structure thanks to a double insulation structure.

The invention claimed is:
1. A water treatment apparatus for producing activated water, comprising:
a vessel having a water inlet and a water outlet and having a flange that extends outward from an upper end of an outer circumferential surface thereof;

an insulating case formed of an insulating synthetic resin in a hollow cylindrical shape and inserted into the vessel, the insulating case including:
an open top end,
a closed bottom end located inside the vessel,
a flange extending outward from an upper end of the insulating case and supported on the flange of the vessel and
a receiving space inside the insulating case and isolated from an interior space of the vessel;
an insulated electrode bar inserted into the receiving space of the insulating case, the insulated electrode bar including:
an electrode bar, and
an internal insulator formed of an insulating material and configured to surround an outer circumferential surface of the electrode bar and a lower end of the electrode bar; and
a high-voltage generation unit installed on the upper end of the insulating case and configured to apply a high voltage to the electrode bar,
wherein the insulating case, together with the internal insulator, forms a double insulation layer for the electrode bar.

2. The water treatment apparatus of claim 1, wherein the flange of the insulating case extends to a position where the flange of the insulating case makes surface-to-surface contact with the flange of the vessel, and the flange of the insulating case and the flange of the vessel are fixedly coupled to each other.

3. The water treatment apparatus of claim 1, wherein a fixing plate having a central hole formed therein is positioned on the upper end of the insulating case and is fixedly coupled to the flange of the vessel, and the electrode bar is electrically connected with the high-voltage generation unit through the central hole of the fixing plate.

4. The water treatment apparatus of claim 1, wherein an empty space between the insulating case and the insulated electrode bar is filled with an insulating filling material.

5. The water treatment apparatus of claim 4, wherein a buffer plate formed of an insulating material is installed between the closed bottom end of the insulating case and a lower end of the insulated electrode bar.

6. The water treatment apparatus of claim 4, wherein the internal insulator of the insulated electrode bar has a hollow cylindrical shape with an empty internal space, and the lower end of which is closed;
wherein the electrode bar is inserted into the empty internal space of the internal insulator; and
wherein an empty space between the internal insulator and the electrode bar is filled with an insulating filling material.

7. The water treatment apparatus of claim 6, wherein a buffer plate formed of an insulating material is installed between the closed lower end of the internal insulator and a lower end of the electrode bar.

8. The water treatment apparatus of claim 1, wherein the vessel has a cylindrical shape, and the inlet and outlet are formed to be inclined with respect to the outer circumferential surface of the vessel.

9. The water treatment apparatus of claim 1, wherein the electrode bar has a non-linear shape that obliquely extends in an up-down direction with respect to a bending point.

10. The water treatment apparatus of claim 1, wherein the electrode bar has a non-linear shape that spirally extends in a longitudinal direction of the electrode bar.

11. The water treatment apparatus of claim 1, further comprising an upper support plate interposed between the flange of the vessel and the flange of the insulating case and partially covering an open top of the vessel.

* * * * *